INVENTOR.
FREDERICK F. CASERIO, JR.
BY
Donald W Canady
ATTORNEY.

United States Patent Office 3,636,087
Patented Jan. 18, 1972

3,636,087
VINYL ACETATE RECOVERY PROCESS
Frederick F. Caserio, Jr., Laguna Beach, Calif., assignor to Atlantic Richfield Company, Philadelphia, Pa.
Filed Sept. 12, 1966, Ser. No. 578,547
Int. Cl. C07c 67/04, 67/06
U.S. Cl. 260—497 R
5 Claims

ABSTRACT OF THE DISCLOSURE

The solvent extraction of vinyl acetate from a reaction product mixture including vinyl acetate, acetic acid, and water including the step of freezing the water and acetic acid prior to extraction and the recirculation of the extracted reaction product mixture for reuse is disclosed.

---

This invention relates to a process for separating vinyl acetate from other reaction products of a vinyl acetate reaction. More particularly, this invention is directed to a process for extracting vinyl acetate from an aqueous reaction solution.

Vinyl acetate is usually produced by any one of three basic processes which involve the reaction between (1) acetic anhydride and acetaldehyde; (2) acetic acid and acetylene in the vapor phase; and (3) acetic acid or acetic anhydride and ethylene. In the process using acetic acid or acetic anhydride and ethylene for example, the ethylene is bubbled through an acetic acid bath in a reaction chamber containing a catalyst suspension. The reaction product mixture usually includes vinyl acetate, acetaldehyde, water, acetic acid, carbon dioxide, nitrogen, oxygen, ethylene and catalyst derivatives. Since most of these products normally remain in the bath, difficulty is often encountered in suitably separating vinyl acetate from the bath.

Normally, in a vinyl acetate production process, the vinyl acetate product is either taken from the reaction chamber as an offgas with side reaction offgases such as acetaldehyde, carbon dioxide, etc., or, as in the two-stage process, the vinyl acetate is pumped from the reaction chamber along with all other products of the reaction and the catalyst suspension to a distillation column where the vinyl acetate is recovered by distillation and further refining. The catalyst suspension bath of the vinyl acetate production system usually contains large amounts of water, acetic acid and catalyst salts. The water reacts with the vinyl acetate to form by hydrolysis acetaldehyde. The salts interfere with the distillation of vinyl acetate and precipitate on the processing equipment eventually clogging the production lines, pumps, valves, etc. Extended contact of these reagents with vinyl acetate after its production is thus undesirable.

One object of this invention is to provide a novel process for separating vinyl acetate from other reaction products.

Another object of this invention is to minimize contact time between vinyl acetate and water in a vinyl acetate reaction zone.

Yet another object of this invention is to separate vinyl acetate from an aqueous bath by use of a liquid extraction media which is immiscible with the bath.

Another object of this invention is to provide a process for separating vinyl acetate from other reaction products wherein the bath temperature may be substantially constant.

Still another object of this invention is to provide a process for separating vinyl acetate from other reaction products prior to distillation of vinyl acetate.

Figure 1:
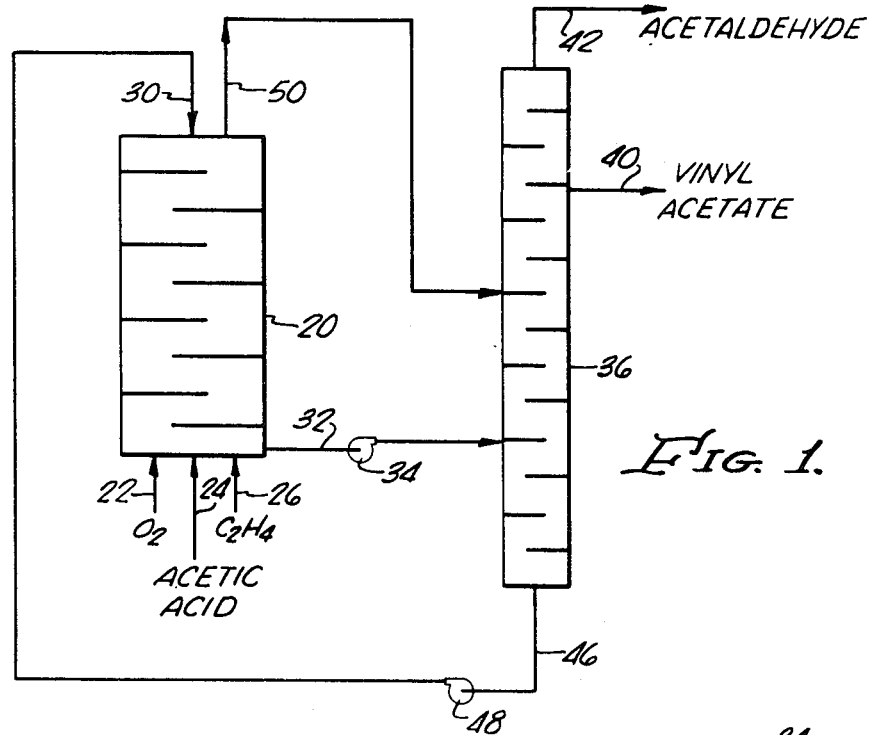
Figure 2:
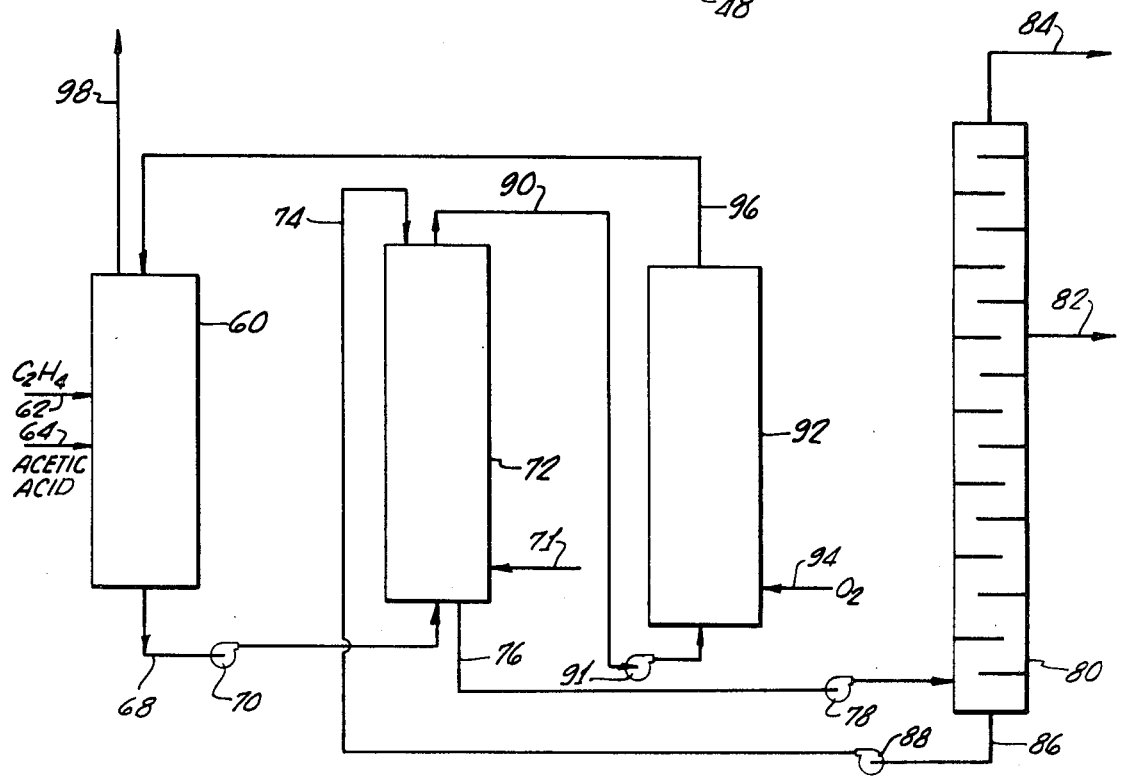

These and other objects of this invention will become more fully apparent from the appended claims and discussion as it proceeds in conjunction with the accompanying drawings wherein:

FIG. 1 is a flow diagram for the process of this invention with a one-stage vinyl acetate production apparatus system; and FIG. 2 is a flow diagram for the process of this invention with a two-stage vinyl acetate apparatus system.

This invention involves a vinyl acetate recovery process using a liquid extractant or solvent which is immiscible with the catalyst bath and is a good solvent for vinyl acetate but not for water or acetic acid. By adding such a liquid to the catalyst bath, the vinyl acetate is dissolved in the extractant and can be separated from the bath by mechanically separating the extractant from the bath without pumping other contents of the bath through the separation system. For example, the extractant may be permitted to settle through the bath and then if the extractant is heavier than the bath, it can be withdrawn from the bottom of the bath, or if lighter, from the top of the bath. The dissolved vinyl acetate can then be separated from the extractant by means of distillation in a conventional distillation chamber without the hindering effects of acetic acid and water.

Referring now to FIG. 1 of the drawings which illustrates diagrammatically how the process of this invention would be used in conjunction with a one-stage vinyl acetate production system, the vinyl acetate reaction zone is confined within a reaction chamber 20 into which suitable reactants are injected through conduits 22, 24, and 26. In the illustrated chamber, the reaction is between oxygen, acetic acid and ethylene in a reaction bath containing an aqueous acetic acid solution and a suspension of catalyst materials which usually contains palladium ions, cupric ions, acetate ions and chloride ions. The liquid extractant, which in this illustration would be heavier than the catalyst bath, is injected into reaction chamber 20 through upper conduit 30. As the extractant settles through the lighter catalyst solution, it dissolves the vinyl acetate which has been produced and may dissolve a small amount of other reaction products such as acetaldehyde. The extractant then accumulates at the bottom of reactor 20 and is withdrawn through conduit 32 by pump 34. The extractant with dissolved vinyl acetate and acetaldehyde is conducted into a distillation tower or column such as column 36 and the vinyl acetate and acetaldehyde products are distilled off through conduits 40 and 42 respectively. After the vinyl acetate and acetaldehyde have been distilled off, the extractant is recirculated through conduit 46 by means of pump 48 into conduit 30 and reaction chamber 20 for extraction of further produced vinyl acetate. This process can be made continuous by pumping the extractant and reactant materials into chamber 20 and withdrawing the vinyl acetate containing extractant from chamber 20 through conduit 32 as the vinyl acetate is produced.

Most of the acetaldehyde will leave reaction chamber 20 through conduit 50 with the other offgases such as carbon dioxide, oxygen, and ethylene from the vinyl acetate reaction. These offgases travel through conduit 50 into distillation column 36. A portion of the acetaldehyde may be dissolved in the extractant and conducted through conduit 32 into column 36.

By continuously operating reactor 20, pump 34 and pump 48 the contact time between produced vinyl acetate, water, which is also produced in reactor 20, and other products of the reaction in chamber 20 is minimized thereby stabilizing the vinyl acetate product and reducing secondary reactions in chamber 20. The amount of extractant initially used for separating vinyl acetate from the other reaction products is dependent upon the quantity of other materials added to reaction chamber 20. The quantity of extractant has to be at least large enough to absorb all of the vinyl acetate which is produced during the reaction in chamber 20. The rate at which the extraction solvent is pumped through conduits 32, 46, and 30 and reaction chamber 20 is dependent primarily upon the amount of time required for gravity settling of the extraction solvent, either upwardly or downwardly through the bath in the reaction chamber. Consequently, the rate also is a function of the difference between the specific gravity of the extractant and the catalyst solution.

The reaction temperature in the main vinyl acetate reaction zone may vary from 65° F. up to 275° F. The pressure may be varied from $\frac{1}{10}$ to 40 atmospheres. Since the residence time of the extractant in the reaction zone is less than 5 minutes, the vinyl acetate extraction is substaintially independent of temperature and pressure within the working temperatures and pressures of the reactor. The amount of water produced during vinyl acetate formation in reactor 20 varies from 5–20 percent by weight of the bath solution and normally constitutes about 10 percent by weight of the bath.

If a liquid extractant is used which is lighter than the catalyst solution in reaction chamber 20, the extractant is pumped through a conduit attached to the bottom of the reaction chamber and the extractant is forced upwardly through the catalyst bath by means of gravity settling of the bath. When a lighter solvent is used for extraction of the vinyl acetate, the extraction solvent and vinyl acetate are withdrawn from the upper portion of the chamber and conducted from there into a distillation tower or column.

Referring now to FIG. 2 which discloses how the process of this invention would be carried out with a two-stage vinyl acetate production system and an extractant heavier than the catalyst solution, the vinyl acetae is produced in a reaction chamber 60, as by the reaction between ethylene and acetic acid which are injected into the reactor through conduits 62 and 64. The catalyst and reaction products are withdrawn from the bottom of chamber 60 through another conduit 68 by means of pump 70 and conducted into a separate extraction vessel, which may be any convenient tank sufficiently large to facilitate the extraction of vinyl acetate by circulation of a liquid extractant through a bath of the catalyst solution and reaction products, such as tank 72. The catalyst bath, while maintained in tank 72, may be stirred or baffled to assure contact of the liquid extractant with the vinyl acetate in the solution.

Water may be fed into tank 72 through conduit 71 to facilitate separation of the vinyl acetate product from the acetic acid bath. This is accomplished since the extractants used are immiscible in water. The amount of water added may vary from 0–70 percent by weight of the bath. The temperature of the bath in tank 72 is maintained sufficiently low to prevent reaction between the vinyl acetate and water.

The extractant is fed into tank 72 through conduit 74 and withdrawn from the bottom of tank 72 through conduit 76 by means of a pump 78. The extractant, which contains dissolved acetaldehyde and vinyl acetate, is then conducted into a distillation tower 80 where the vinyl acetate is distilled off through conduit 82 and the lower boiling point acetaldehyde is distilled off through conduit 84. Conduits 82 and 84 may lead to the appropriate refining trains for vinyl acetate and acetaldehyde respectively. The extractant solvent is then withdrawn from the bottom of distillation tower 80 through conduit 86 and recirculated by pump 88 into conduit 74 and back into extraction vessel 72. The catalyst solution is withdrawn from the extraction vessel through conduit 90 and pumped into catalyst oxidizer 92 by pump 91. In catalyst oxidizer 92, the catalyst is contacted with oxygen fed in through conduit 94 for regenerating the catalyst by oxidizing it to its initial higher valence state. The regenerated catalyst solution may then be recirculated through conduit 96 into reaction chamber 60. The solution prior to re-entry into chamber 60 may also be circulated through appropriate apparatus (not shown) for reducing the water content.

The offgases containing oxygen, ethylene, acetaldehyde, etc., are withdrawn from main reactor 60 through conduit 98 and may be transmitted to further refining or separation apparatus for appropriate treatment.

Preferably, the process of liquid extraction of vinyl acetate and acetaldehyde from the reaction products of reactor 60 is continuous with the two-stage vinyl acetate production process as in the one-stage process. By maintaining this process continuous, the total residence time of the extractant in the separation tank is limited to about 2 minutes or less. Appropriate separators, recirculators, condensers, reboilers, etc., may be included in the actual production system but have been omitted from the flow diagram for purposes of convenience.

The temperature in separation tank 72 may be varied from −75° to 150° F. Preferably, the temperature is maintained sufficiently low to prevent reaction between the bath components and water added through conduit 71. As will be discussed, it has been found to be beneficial in certain instances to reduce the bath temperature below the melting points of water and acetic acid. Normally the water temperature is not varied from that of its storage tank and the bath temperature in tank 72 is maintained at ambient temperatures from about 65–90° F.

The extraction process has been found to be independent of pressure and thus tank 72 can be at atmospheric pressure. While up to 70 percent by weight water can be added to tank 72, preferably from 10–50 percent is added depending on the extractant being used.

If a liquid extractant is used which is lighter than the catalyst solution, conduit 74 will feed directly into the bottom of extraction chamber 72 and the extractant solvent will be withdrawn from the upper portion thereof as discussed with respect to FIG. 1. It has been found that the straight chained and branched hydrocarbons are acceptable as extractants in the process of this invention. Most of the hydrocarbon extraction solvents contemplated for use in this invention are lighter than the catalyst solution baths, whereas the chlorinated hydrocarbons which have also been found to be operable are heavier than the catalyst bath. Dodecane, isooctant, tetralin, trichloroethylene, mixed xylenes, toluene, heavy alkylate, hydrogenated heavy alkylate, hexadecane, hexane, methylene chloride, n-pentane and monochlorobenzene have all been found to be satisfactory as extractant solvents for vinyl acetate in the process of this invention. Their chlorinated derivatives also have been found to be operable. As stated, these chlorinated hydrocarbons are usually heavier than the catalyst bath and settle downwardly through the bath by the force of gravity.

The mixed xylenes have been found to be preferable for use as the liquid extractants of this invention since they have a good solubility for vinyl acetate and concurrently a good rejection value for acetic acid. In general, these two values, i.e. high solubility for vinyl acetate and low solubility for acetic acid, as well as the requirement for immiscibility with water and the catalyst solution are essential characteristics of the extractant solvent of this invention. Due to their relatively good solubility for vinyl acetate and high rejection value for acetic acid, mixed xylenes and more specifically mixed xylenes having a boiling range from about 130° to 150° C. and a specific gravity of from about 0.8 to 0.9 are preferred as the liquid extractants of this invention.

It is further contemplated that a material which has a high rejection number for water is valuable as an extractant because of its selectivity for vinyl acetate in a relatively dry state. This substantially reduces hydrolysis of vinyl acetate to acetaldehyde, both during the extraction step and during subsequent distillation. A particularly good liquid extractant based on the water rejection concept is n-tetradecane.

It has been found that separation of vinyl acetate from the reactant products can be facilitated by reducing the temperature of the vinyl acetate containing bath to freeze out water and acetic acid and by using a hydrocarbon extractant which remains liquid at temperatures on the order of −50° F. Alkylate has been found to be a particularly good liquid solvent for use in extraction at these lower temperatures since it remains liquid while the acetic acid and water freeze out. It has also been found that alkylate can be diluted with an equal amount of kerosene without interfering with the extraction of vinyl acetate at temperatures on the order of −50° F.

EXAMPLES I–XII

A mixture of 15 ml. glacial acetic acid and 5 ml. vinyl acetate was diluted in four separate runs to water contents of 11, 20, 33.3 and 50 percent by volume. Each dilution was extracted with 10 ml. of solvent at 72° F. and a pressure of one atmosphere using the solvent materials listed in Table 1. The results of these extractions were good and indicated that the hydrocarbon extraction of vinyl acetate from an acetic acid and water solution is possible and may be commercially desirable. The results of titration with bromine of both the aqueous-rich and the solvent-rich phases are shown in Table 1 in terms of the ratio of vinyl acetate (ViOAc) in the solvent extract to vinyl acetate in the aqueous raffinate and of the ratio of vinyl acetate to acetic acid in the extract.

TABLE 1.—VINYL ACETATE RECOVERY BY SOLVENT EXTRACTION

| Solvent | Water,[a] mol percent | ViOAc[b] in extract/ ViOAc in raffinate | ViOAc in extract/ acetic acid in extract |
|---|---|---|---|
| Isooctane | 11 | 0.5 | 0.62 |
|  | 20 | 0.62 | 1.2 |
|  | 33.3 | 1.0 | 2.3 |
|  | 50 | 2.5 | 4.2 |
| Dodecane | 11 | 0.28 | 0.82 |
|  | 20 | 0.41 | 1.5 |
|  | 33.3 | 0.57 | 2.6 |
|  | 50 | 1.2 | 4.2 |
| Tetralin | 11 | 0.87 | 0.34 |
|  | 20 | 1.1 | 0.76 |
|  | 33.3 | 1.8 | 1.5 |
|  | 50 | 4.1 | 3.0 |
| Trichloroethylene | 11 | Miscible |  |
|  | 20 | 1.9 | 0.44 |
|  | 33.3 | 3.1 | 0.78 |
|  | 50 | 6.9 | 1.6 |
| Xylene (mixed xylenes with a boiling point from 130–150° C. and a specific gravity from .8–.5). | 11 | Miscible |  |
|  | 20 | 1.4 | 0.53 |
|  | 33.3 | 3.6 | 1.1 |
|  | 50 | 6.2 | 2.3 |
| Toluene | 11 | Miscible |  |
|  | 20 | 1.8 | 0.53 |
|  | 33.3 | 5.6 | 0.94 |
|  | 50 | 5.5 | 1.8 |
| Heavy alkylate | 11 | 0.36 | 0.90 |
|  | 20 | 0.46 | 1.5 |
|  | 33.3 | 0.70 | 2.8 |
|  | 50 | 1.0 | 2.8 |
| Hydrogenated heavy alkylate | 11 | 0.19 | 0.86 |
|  | 20 | 0.25 | 1.8 |
|  | 33.3 | 0.35 | 3.0 |
|  | 50 | 0.75 | 2.4 |
| Hexadecane | 11 | 0.24 | 0.99 |
|  | 20 | 0.27 | 1.5 |
|  | 33.3 | 0.50 | 4.0 |
|  | 50 | 1.0 | 5.2 |
| Hexane | 11 | 0.50 | 0.52 |
|  | 20 | 0.64 | 1.02 |
|  | 33.3 | 0.84 | 1.62 |
|  | 50 | 2.4 | 3.8 |
| Methylene chloride | 20 | Miscible |  |
|  | 33.3 | 4.1 | 0.56 |
|  | 50 | 10.7 | 1.1 |
| n-Pentane | 11 | 0.54 | 0.46 |
|  | 20 | 0.73 | 0.91 |
|  | 33.3 | 1.2 | 1.8 |
|  | 50 | 3.0 | 3.6 |

[a] Original water content of vinyl acetate-acetic acid mixture.
[b] Vinyl acetate.

As Table 1 shows, the mixed xylenes were found to have the most favorable combination of vinyl acetate solubility and ability to reject acetic acid. These properties have been found to be essential characteristics of a good vinyl acetate extraction solvent.

The vinyl acetate extraction with mixed xylenes were performed with mixed xylene solutions having the following typical properties and compositions:

|  | Mixed xylene A | Mixed xylene B |
|---|---|---|
| Composition, percent by vol: |  |  |
| Non-aromatic | 5.2 | 9.5 |
| Toluene | 0.6 | 0.1 |
| Ethylbenzene | 6.4 | 10.0 |
| Metaxylene | 46.4 | 38.7 |
| Paraxylene | 19.5 | 16.0 |
| Orthoxylene | 21.8 | 25.6 |
| Compounds having greater than 9 carbons | 0.1 | 0.1 |
| Specific gravity | .864 | .843 |
| Boiling range, °C | 138.8–142.0 | 135.0–147.7 |

Both mixed xylene solutions exhibited good vinyl acetate solubility and acetic acid rejection properties. The mixed xylenes having a boiling range of from 130–150° C. and a specific gravity of from .8 to .9 are preferable as solvents for liquid extraction of vinyl acetate.

EXAMPLE XIII

To further examine the effectiveness of mixed xylene extractants, vinyl acetate containing solutions were prepared as in Example I and diluted to water contents of 11, 20, 33.3, 50, 60 and 67 percent by volume. A mixed xylene solvent was then bubbled through the solution and extracted from the top. Table 2 shows that the mixed xylenes increased in effectiveness as extractants as the percentage of water in the initial solution increased. This was due to the low solubility of the extractant and vinyl acetate in water.

TABLE 2.—VINYL ACETATE RECOVERY BY XYLENE EXTRACTION

|  | ViOAc in Extract/ ViOAc in raffinate | ViOAc in extract/ acetic acid in extract |
|---|---|---|
| Water content initial, vol. percent: |  |  |
| 11 | 1.41 | 0.53 |
| 20 | 3.58 | 1.15 |
| 33.3 | 6.2 | 2.25 |
| 50 | 5.7 | 2.22 |
| 60 | 8.1 | 2.83 |
| 67 | 11.9 | 5.0 |

EXAMPLE XIV

A mixture of 10 ml. water, 15 ml. acetic acid, 5 ml. vinyl acetate and 10 ml. mixed xylene as the extractant (composition xylene B) was prepared. The solution was shaken vigorously for about 10 seconds, allowed to settle and the extractant was drawn off from the top. The vinyl acetate and acetic acid distributions in the extractant and aqueous solution were 40.2 millimoles of vinyl acetate in the xylene extract, 15.8 millimoles vinyl acetate in the water phase, 17.8 millimoles of acetic acid in the extract and 249.9 millimoles acetic acid in the water phase. The ratio of vinyl acetate in the extract to vinyl acetate in the water phase was 2.5. The ratio of vinyl acetate in the extract to acetic acid in the extract was 2.3.

EXAMPLE XV

A mixture was prepared from 15 ml. acetic acid, 5 ml. vinyl acetate and 20 ml. water. A 10 ml. mixed xylene solution was bubbled through the acetic acid-vinyl acetate-water mixture at a temperature of 70° F. and a pressure of one atmosphere. The ratio of millimoles per milliliter of vinyl acetate in the extract to millimoles per milliliter of vinyl acetate in the raffinate was 5.7. The same ratio of vinyl acetate to acetic acid in the extract was 2.2. Another 10 ml. quantity of mixed xylene was bubbled through the same vinyl acetate, acetic acid and water mixture and extracted. The ratio of millimoles per milliliter of vinyl acetate in the extract to vinyl acetate in the raffinate ratio was 4.8. The same vinyl acetate to acetic acid ratio in the extract was 1.3. Again another 10 ml. sample of mixed xylenes was bubbled through the vinyl acetate-acetic acid-water mixture and extracted therefrom. The millimoles per milliliter ratio of vinyl acetate in the extract to vinyl acetate in the raffinate was 3.1. The ratio of vinyl acetate in the extract to acetic acid in the extract was 0.4. The distribution of the vinyl acetate and acetic acid may be further appreciated from a consideration of Table 3 which gives the quantities of these materials in millimoles. The three identical extraction steps illustrate the value of mixed xylenes as extraction solvents for vinyl acetate from acetic acid and water solutions. After the third extraction, the ratio of vinyl acetate in the extract to that in the raffinate was still favorable. This was in part due to the fact that the amount of vinyl acetate retained in the raffinate was lowered by the first two extraction steps. The ratio of vinyl acetate to acetic acid in the extract decreased after the first two extraction steps in correspondence with the decrease in vinyl acetate concentration of the solution.

From this example, it was concluded that vinyl acetate partition between extract and raffinate was favorable even after 3 extractions. Rejection of acetic acid by the extracting mixed xylenes decreases with multiple extractions but still is acceptable after three extractions.

TABLE 3.—VINYL ACETATE RECOVERY WITH MULTI-EXTRACTION STEPS

|  | Acetic acid (millimoles) | Vinyl acetate (millimoles) |
|---|---|---|
| 1st Extraction: |  |  |
| Water phase | 246.0 | 16.6 |
| Xylene phase | 18.2 | 39.8 |
| 2d Extraction: |  |  |
| Water phase | 214.2 | 5.4 |
| Xylene phase | 7.9 | 10.1 |
| 3rd Extraction: |  |  |
| Water phase | 183.6 | 1.8 |
| Xylene phase | 6.2 | 2.4 |

EXAMPLE XVI

A mixture of 20 ml. acetic acid, 20 ml. vinyl acetate, and 3 ml. water was prepared. To this mixture was added 50 ml. of alkylate as an extraction solvent. The mixture was placed in a refrigerant and cooled to −30° F. and then to −50° F. Samples of the organic phase were taken at each temperature with the following results:

|  | −30° F. | −50° F. |
|---|---|---|
| Viny acetate, wt. percent | 22.8 | 23.7 |
| Acetic acid | 7.5 | 2.54 |
| Water | 0.25 | 0.066 |

EXAMPLE XVII

A mixture of 20 ml. acetic acid, 20 ml. vinyl acetate and 3 ml. of water was prepared. A liquid extractant consisting of 50 ml. kerosene and 50 ml. alkylate was added to the mixture. The mixture was cooled and samples of the extractant were withdrawn at −30° F. and −50° F. The vinyl aceate, acetic acid and water contents of the extractant were approximately the same as when alkylate alone was used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A process for producing vinyl acetate comprising the steps of:
   (a) reacting ethylene with acetic acid in the presence of a catalyst system to produce a reaction product mixture including acetic acid, catalyst, vinyl acetate and an aqueous portion;
   (b) contacting the reaction product mixture from step (a) with a mixture of xylenes having a boiling range from about 135°–145° C. and a specific gravity of from about 0.8 to 0.9 thereby preferentially dissolving vinyl acetate in said solvent;
   (c) separating the liquid solvent and dissolved vinyl acetate from the reaction product mixture;
   (d) recovering vinyl acetate from the solvent;
   (e) reacting ethylene and acetic acid in reaction product mixture, including the catalyst system, from which the vinyl acetate has been extracted; and
   (f) repeating preceding steps (b), (c), (d), and (e).

2. A process as defined in claim 1 further including the step of adding up to 70 percent by weight water to said mixture before dissolving said vinyl acetate into said solvent.

3. A process as defined in claim 1 further including the step of cooling the mixture at least to a temperature sufficiently low to solidify the aqueous and acetic acid portions of the mixture prior to separating the solvent from the mixture.

4. A process for extraction of vinyl acetate from a mixture of reaction products resulting from the catalytic synthesis of vinyl acetate, said reaction product mixture including acetic acid and an aqueous portion comprising the steps of:

dissolving vinyl acetate from said mixture in a liquid hydrocarbon or chlorinated hydrocarbon solvent which has a higher solubility for vinyl acetate than for the other components of the mixture and which is immiscible with the mixture;

cooling the mixture at least to a temperature sufficiently low to solidify the aqueous and acetic acid portions of the mixture;

separating the liquid solvent and dissolved vinyl acetate from the mixture; and recovering the vinyl acetate from the solvent.

5. A process for producing and recovering vinyl acetate comprising the steps of:

injecting acetic acid and ethylene into a reaction zone in the presence of a catalyst system;

providing sufficient temperature and pressure in said reaction zone to cause the formation of a mixture of reaction products including vinyl acetate due to the reaction of said acetic acid with said ethylene;

bubbling a xylene solvent upwardly through said mixture to dissolve said formed vinyl acetate;

separating said solvent from said mixture with said vinyl acetate dissolved therein; and again injecting acetic acid and ethylene into said reaction zone in the presence of said extracted reaction mixture for producing additional vinyl acetate.

References Cited

FOREIGN PATENTS

| 608,610 | 3/1962 | Belgium | 260—497 |
| 966,809 | 8/1964 | Great Britain | 260—497 |
| 969,162 | 9/1964 | Great Britain | 260—497 |
| 1,003,396 | 9/1965 | Great Britain | 260—497 |
| 1,424,738 | 12/1965 | France. | |

LORRAINE A. WEINBERGER, Primary Examiner

V. GARNER, Assistant Examiner

U.S. Cl. X.R.

260—497A, 499, 604 AC